(12) United States Patent
Dowling

(10) Patent No.: US 7,164,908 B2
(45) Date of Patent: Jan. 16, 2007

(54) FIXED AND ROVING WIRELESS SYSTEM MONITORS

(75) Inventor: Martin J. Dowling, Plymouth Meeting, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 168 days.

(21) Appl. No.: 10/749,053

(22) Filed: Dec. 30, 2003

(65) Prior Publication Data
US 2005/0143062 A1    Jun. 30, 2005

(51) Int. Cl.
*H04Q 7/20* (2006.01)

(52) U.S. Cl. ............. 455/423; 455/424; 455/67.11

(58) Field of Classification Search ......... 455/423, 455/424, 446, 67.11, 67.13, 67.14
See application file for complete search history.

(56) References Cited

U.S. PATENT DOCUMENTS

| | | | |
|---|---|---|---|
| 5,425,076 A * | 6/1995 | Knippelmier | 379/27.04 |
| 6,064,890 A * | 5/2000 | Hirose et al. | 455/513 |
| 6,336,035 B1 * | 1/2002 | Somoza et al. | 455/446 |
| 6,522,888 B1 * | 2/2003 | Garceran et al. | 455/456.3 |
| 6,754,487 B1 * | 6/2004 | Sanders et al. | 455/423 |
| 2004/0203725 A1 * | 10/2004 | Lahav et al. | 455/423 |

* cited by examiner

*Primary Examiner*—Erika A. Gary
(74) *Attorney, Agent, or Firm*—Volpe and Koenig, P.C.

(57) ABSTRACT

The invention provides for various cell condition measuring devices and methods. One aspect is a mobile wireless monitor. The mobile monitor takes channel quality information and location information for use in cell condition analysis. Another aspect is a fixed wireless monitor. The fixed monitor takes channel quality information and sends it to a monitored source. Another aspect is a method for analyzing cell channel conditions. A baseline of the channel conditions is generated and wireless monitors update the baseline. Another aspect is a method for base station site selection. A mobile wireless monitor is used to determine an optimum base station site.

1 Claim, 6 Drawing Sheets

FIXED AND ROVING WIRELESS SYSTEM MONITORS

FIELD OF INVENTION

The invention generally relates to wireless communication systems. In particular, the invention relates to monitoring wireless channel conditions in such systems.

BACKGROUND

Figure 1:
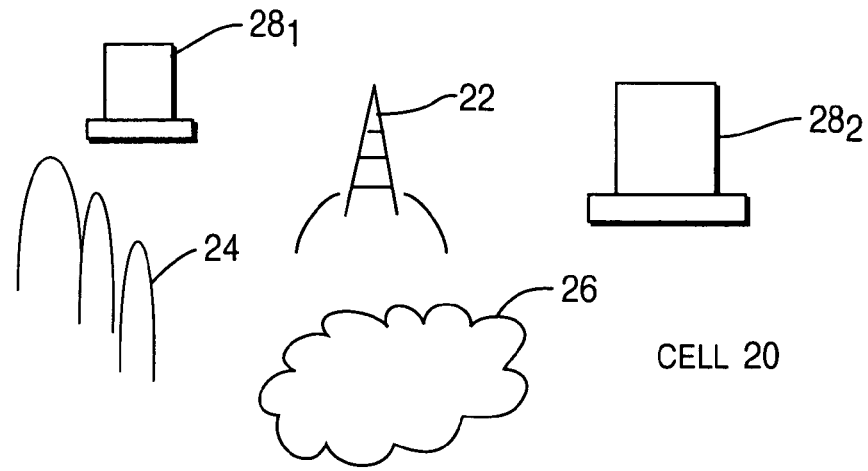

FIG. 1 is an illustration of a cell 20 in a wireless communication system. As illustrated, the cell 20 has varying features, such as trees 26, hills 24 and buildings $28_1$, $28_2$. As wireless users move around the cell 20, the wireless channel conditions change as a result of these features, weather, proximity to the base station 22 and other factors.

Wireless systems typically have features to compensate for changes in channel conditions, such as transmission power control and automatic frequency control. These compensation techniques operate blindly in a reactive manner. To illustrate, a wireless user communicating with a base station 22 encounters a small fade in the received signal power, such as due to an obstruction. The base station 22 senses a drop in the measured signal to interference ratio (SIR) and instructs the user to increase its power level accordingly.

Such compensation features may not be sufficient in certain situations. If channel conditions change dramatically, such as a result of a deep fade or severe Doppler shift, the reactive compensation techniques may not keep pace and the link quality suffers, resulting is unacceptable quality of service (QOS). If the channel conditions change too rapidly, the communication links between the wireless user and the base station 22 may even be lost.

Accordingly, it is desirable to be aware of such wireless channel conditions.

SUMMARY

The invention provides for various cell condition measuring devices and methods. One aspect is a mobile wireless monitor. The mobile monitor takes channel quality information and location information for use in cell condition analysis. Another aspect is a fixed wireless monitor. The fixed monitor takes channel quality information and sends it to a monitored source. Another aspect is a method for analyzing cell channel conditions. A baseline of the channel conditions is generated and wireless monitors update the baseline. Another aspect is a method for base station site selection. A mobile wireless monitor is used to determine an optimum base station site.

BRIEF DESCRIPTION OF THE DRAWING(S)

Figure 3:
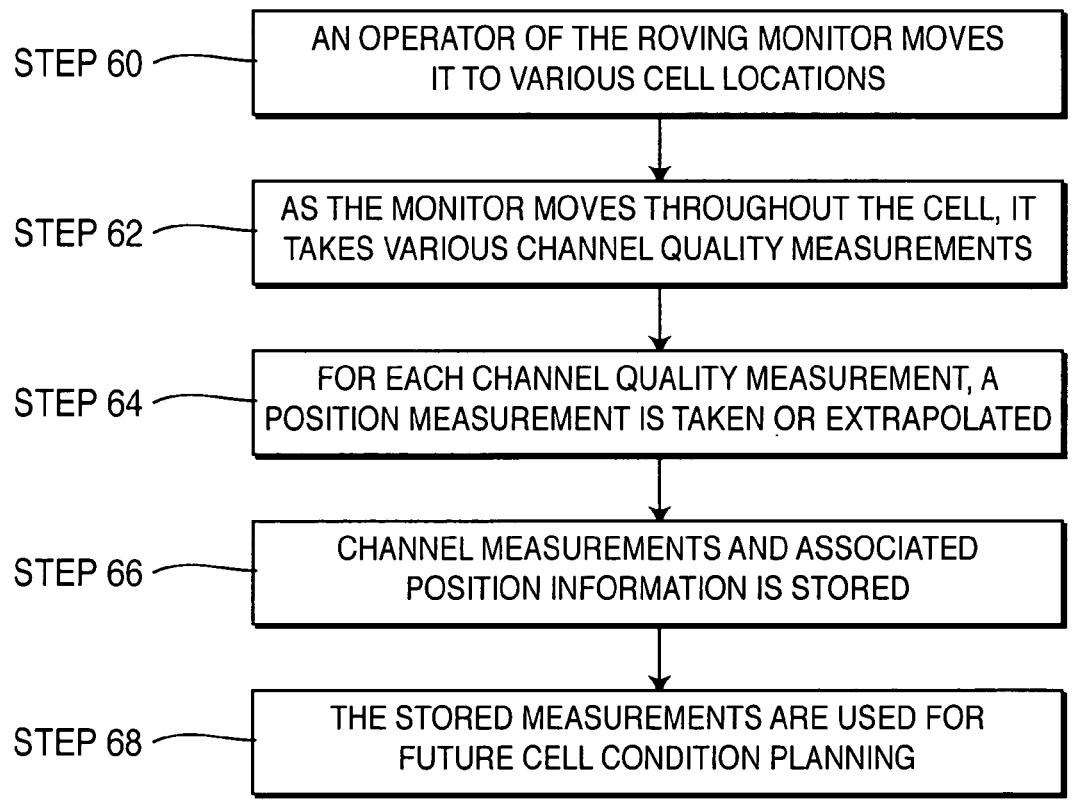
Figure 2A:
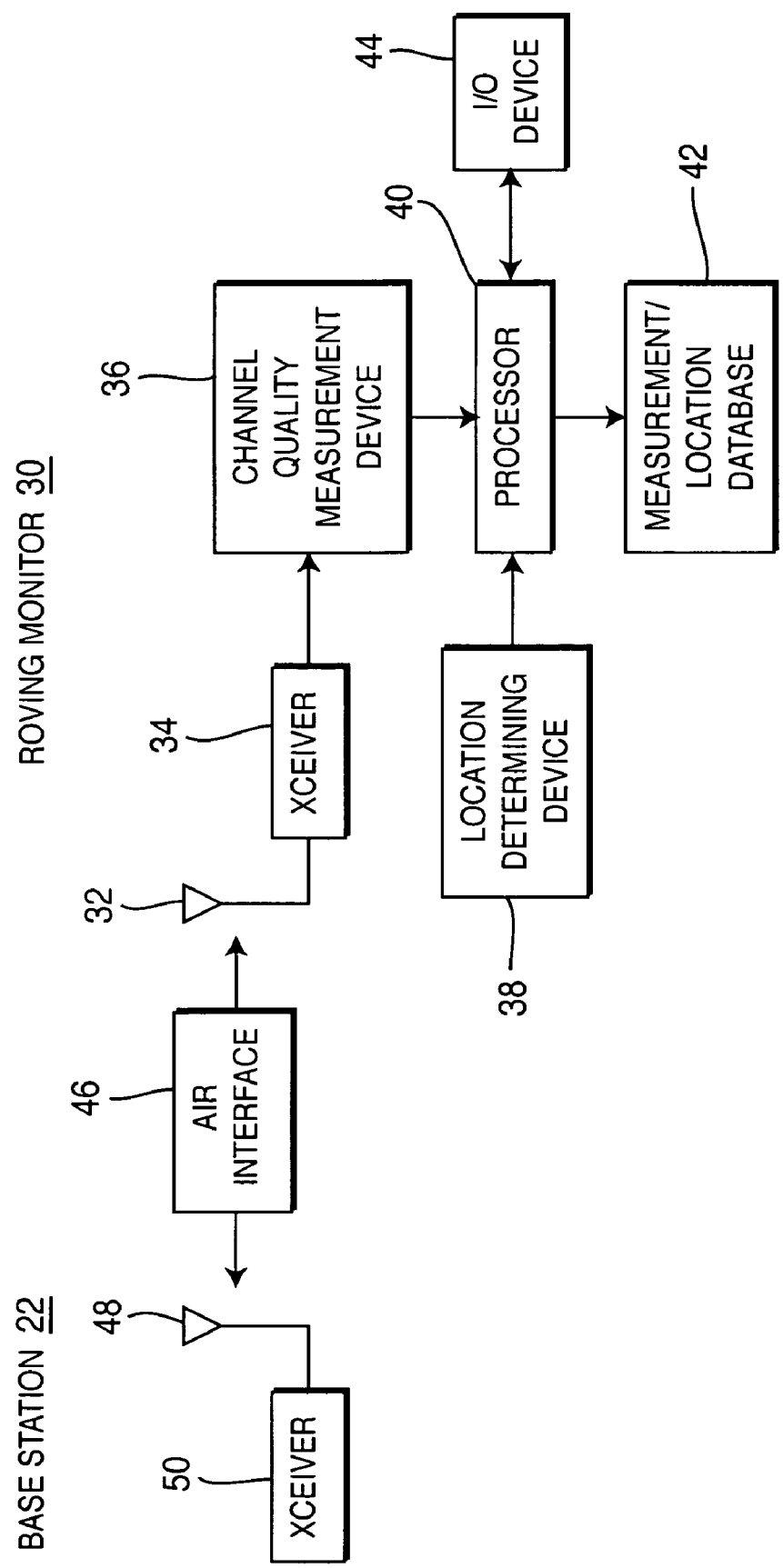
Figure 2B:
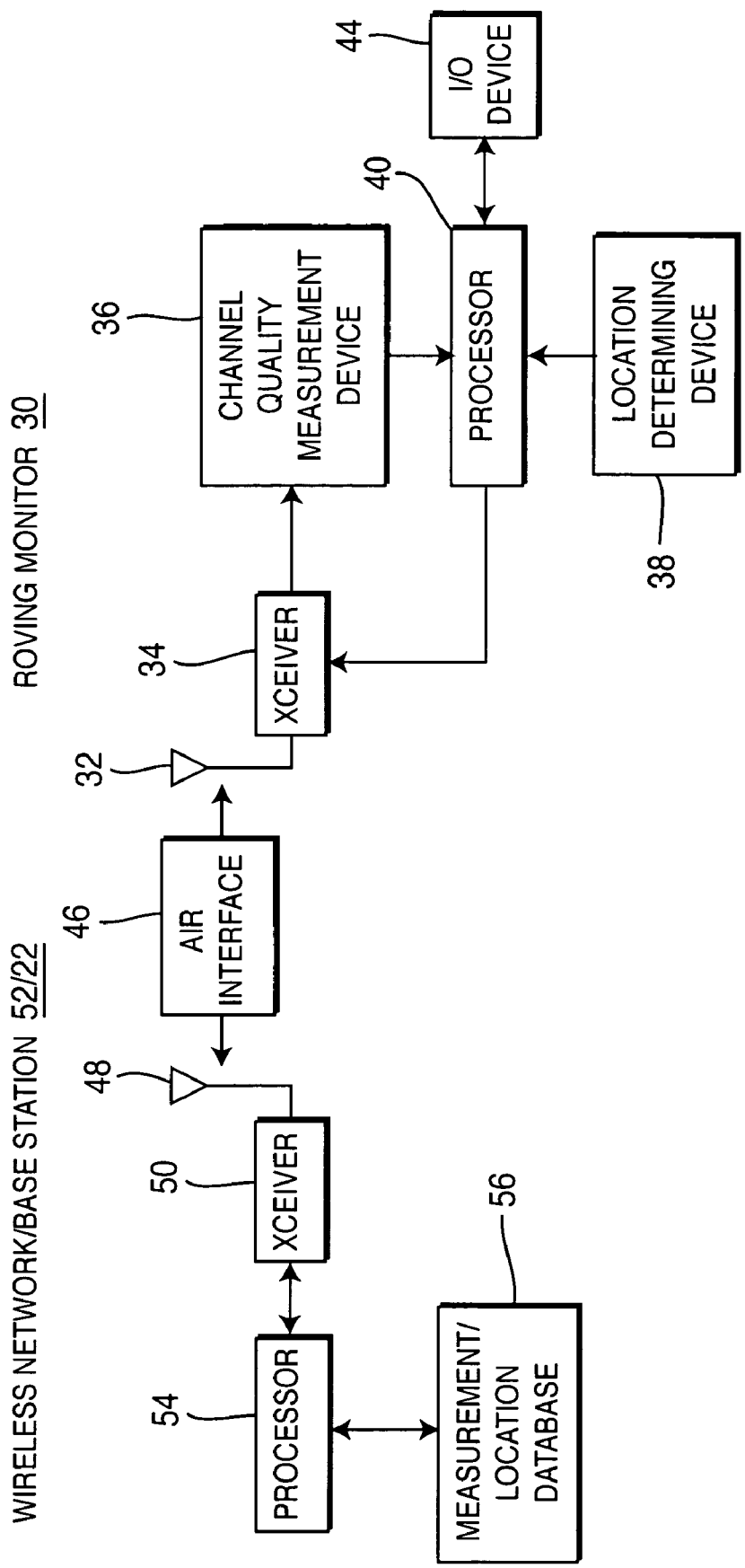
Figure 4:
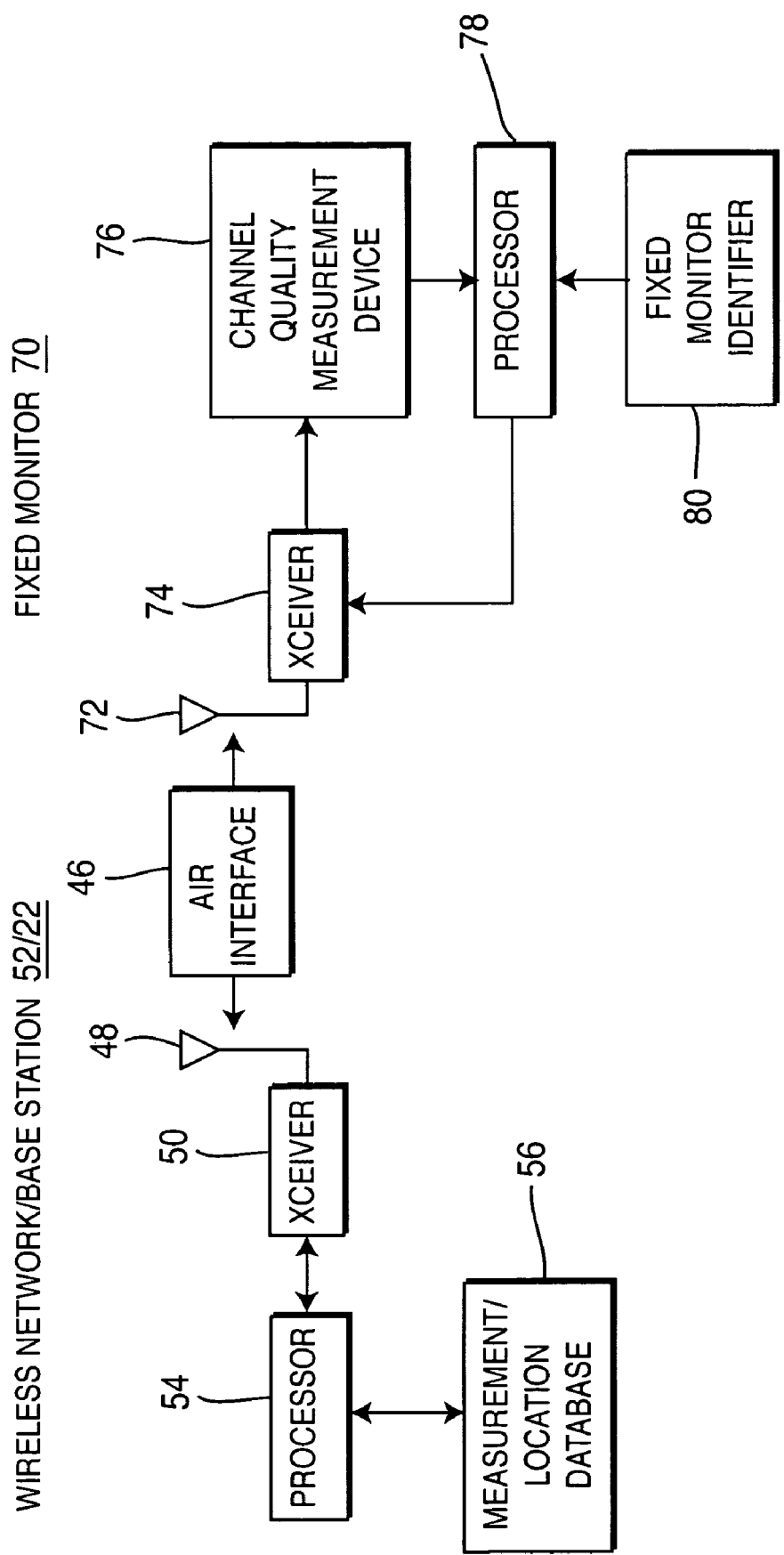
Figure 5:
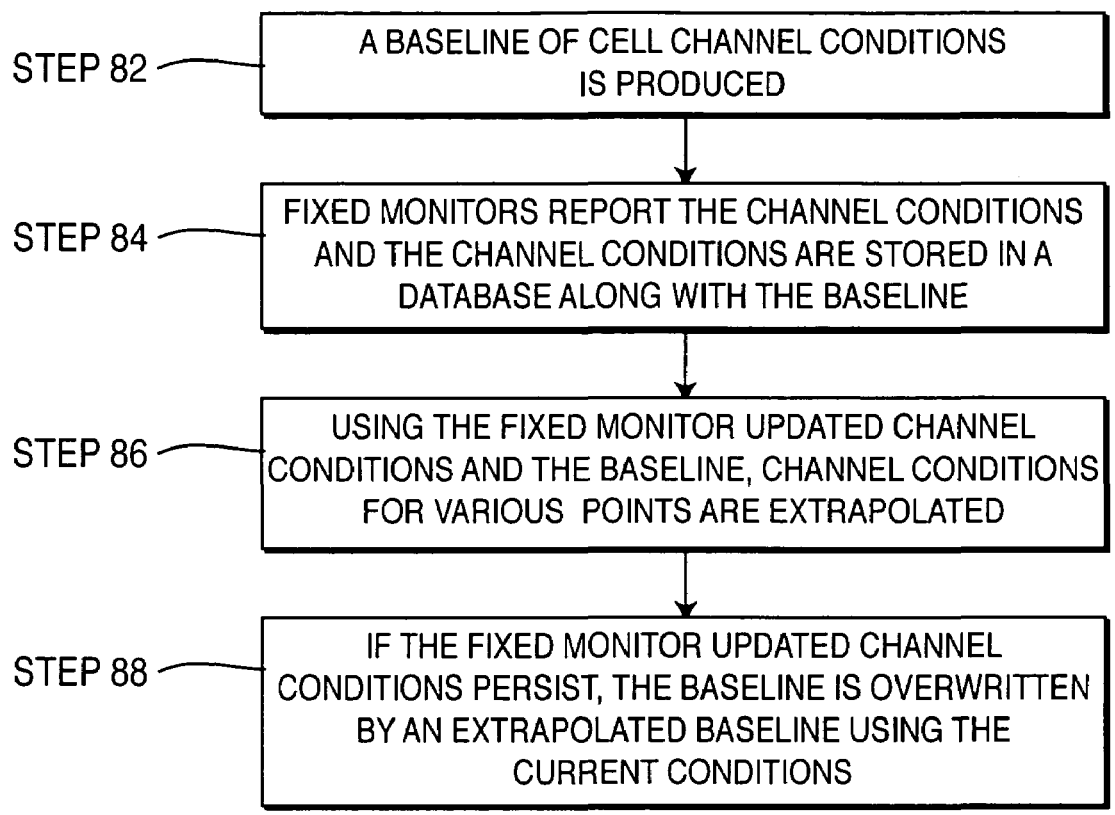
Figure 6:
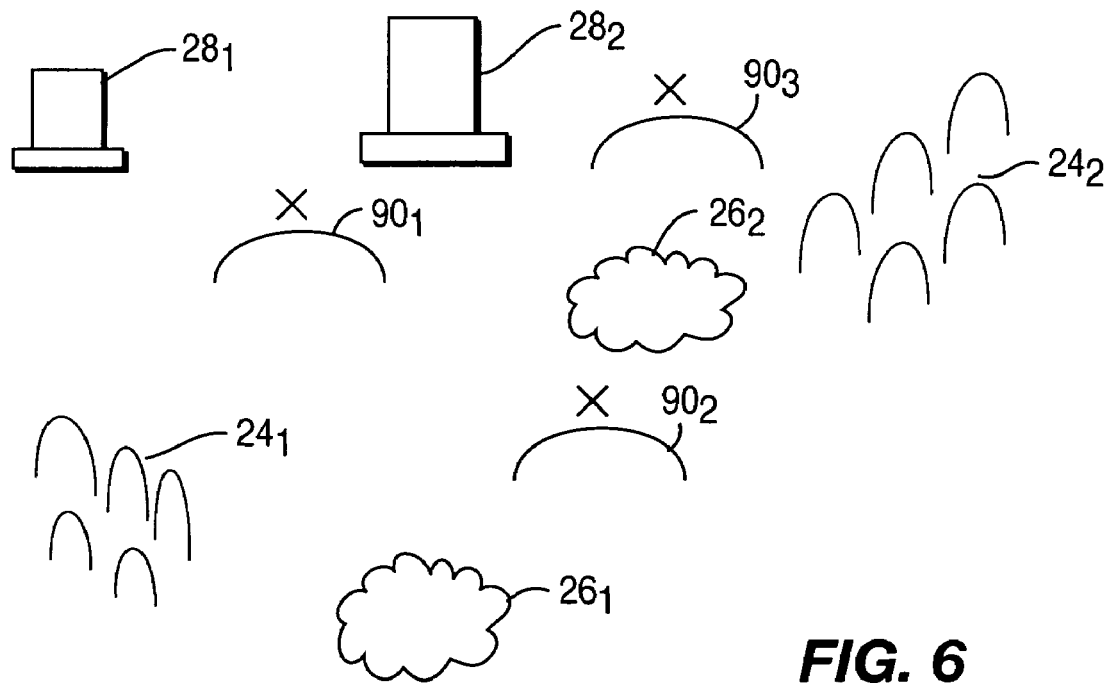
Figure 7:
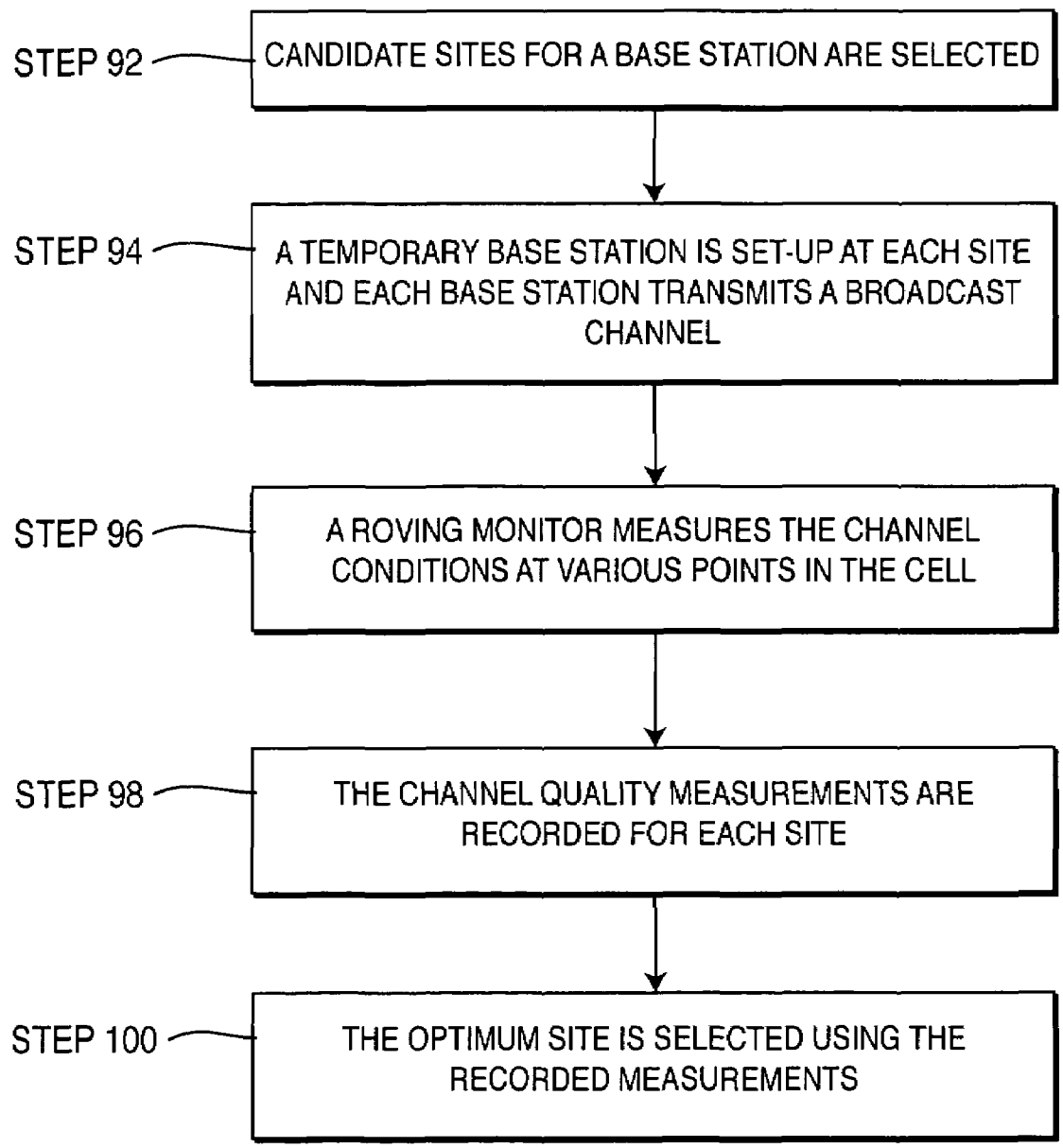

FIG. 1 is a simplified illustration of a cell.
FIGS. 2A and 2B are simplified diagrams of roving monitor embodiments.
FIG. 3 is a flow diagram of wireless monitoring.
FIG. 4 is a simplified diagram of a fixed monitor.
FIG. 5 is a flow diagram of fixed monitoring.
FIG. 6 is a simplified illustration of potential base station sites.
FIG. 7 is a flow diagram of base station siting.

DETAILED DESCRIPTION OF THE PREFERRED EMBODIMENT(S)

Although the preferred embodiments are described in context of a preferred cellular system, the embodiments are applicable to any wireless system, such as a wireless local area network or Bluetooth environment. Hereafter, a base station includes but is not limited to a base station, Node-B, site controller, access point or other interfacing device in a wireless environment.

FIG. 2A is a simplified block diagram of a roving monitor environment. The roving monitor 30 has an antenna or antenna array 32 and a transceiver (Xceiver 34) for receiving wireless signals. The roving monitor 30 has a location determining device 38 for determining the geographic location of the roving monitor 30. The location determining device 38 may utilize global positioning system (GPS) based or cellular based positioning techniques. In alternate embodiments, the positioning determining may occur in the wireless network instead of at the roving monitor, based on the location determining scheme utilized.

The roving monitor 30 has a channel quality measuring device 36 capable of performing various channel quality measurements. These measurements may include interference measurements (such as from other cells), received signal strength measurements and path loss measurements for specified channels and Doppler shifts of specified carriers.

To illustrate for use in a Third Generation Partnership Project (3GPP) proposed system, the roving monitor may measure the received signal code power (RSCP) of the Primary Common Control Physical Channel (P-CCPCH), the interference signal code power (ISCP) and path loss for the P-CCPCH. Alternately, the monitor can analyze dedicated channels. Typically, channel compensation techniques, such as power control, are turned off so that the roving monitor analyzes the uncompensated channel. To illustrate, the roving monitor may be constructed as to not utilize outer loop power control techniques. The base station 22 has a transceiver 50 and antenna or antenna array 48 for transmitting these signals to the roving monitor 30 through the air interface 46.

A processor 40 receives the location information and the measurement information and stores the measurements along with a location that the measurement was taken and a speed at which the roving monitor 30 was moving in a location and measurement database 42. Since exact location and instantaneous movement vector measurements may not be made contemporaneously with the measurements, these values may be extrapolated from prior and post measurement location determinations. To illustrate, location measurements may be taken every tenth of a second. The location for a point between tenths may be extrapolated using linear interpolation between the measurements at the tenths. The movement vector may be interpolated by the distance and direction change between the tenths locations.

Additional, information may also be stored along with the measurements, such as weather conditions, notes and other factors. The notes may be input by an operator of the roving monitor using an input/output (I/O) device 44. At a later point, the database 42 is downloaded for use in cell channel condition planning.

In the embodiment of FIG. 2B, the measurement and location database is stored in the wireless network 52. The roving monitor sends a message containing the location and measurement information to the base station 22 through the air interface 46 using its transceiver 34. The base station transceiver 50 receives the message. A processor 54 of the wireless network 52/base station 22 stores the measurement and location information in a database 56 for use in cell condition planning.

FIG. 3 is a flow chart of wireless monitoring. An operator of the roving wireless monitor 30 moves the monitor 30 to various locations in the cell, (step 60). If the monitor 30 is being utilized to collect channel quality measurements throughout the cell 20, the operator moves the roving monitor throughout the cell 20. If the monitor 30 is being utilized to analyze trouble spots, the monitor 30 is moved to those spots or situations. To illustrate, many calls may be dropped as wireless users travel along a sharp curve in a highway. The monitor 30 can collect pathloss and Doppler (frequency shift) information to determine the root of the problem. The monitor 30 may also be used to analyze the high wireless traffic areas. To illustrate, the operator of the monitor 30 may utilize the wireless monitor 30 in all heavy vehicular and pedestrian routes. In this illustration, the operator drives along the main roads or walks along the pedestrian routes in the cell, following normal driving/walking behavior and traffic patterns.

As the wireless monitor 30 moves through the cell, the monitor takes various channel quality measurements, (step 62). In one embodiment, the measurements are taken periodically, such as every radio frame or tenth of a second. In alternate embodiments, the operator can control the measurements using the monitor's I/O device 44. A position measurement is taken or extrapolated for each channel quality measurement, (step 64). Preferably in one embodiment as the measurements are taken, the results are displayed and/or annunciated using the I/O device 44, so that if the reception is exceptionally poor or good in an area, the driver can make a notes entry, such as by keypad or voice annotation, as to a reason for the exceptional value, such as "passing a large body of water".

The channel measurement, position and notes information is stored in the measurement or position database 42, 56, (step 66). The database 42, 56 may reside in the wireless monitor 30 or the wireless network 52. The stored measurements are used for future cell condition planning, (step 68). To illustrate, the measurements may be used to indicate where repeaters are required or new base stations are needed. These measurements also may be used by the network to proactively compensate users for incoming channel changes. To illustrate as a user approaches a sharp curve, the network may change its transmission power level and signal the user to shift its carrier frequency in anticipation of the upcoming channel changes.

Although roving monitors can be used to assess the various channel quality conditions throughout a cell, the channel conditions can change over time. In the short term, the conditions may change due to the varying loadings of the cell and neighboring cells, weather, time of day as well as other factors. Over longer period of times, new interferers may be added or removed from the cell and obstructions may be built or removed. To continually update the channel condition information, fixed monitors may be used.

FIG. 4 is a simplified block diagram of a fixed monitor system. Preferably, the fixed monitors 70 utilize solar power in rural areas and traditional AC power in urban areas, although various power sources may be used. The fixed monitor 70 has an antenna or antenna array 72 for receiving signals from the base station 22 over the air interface 46. A transceiver 74 receives these signals. A channel quality measurement device 76 takes the channel quality measurements. The measurements may include received signal power, interference measurements, pathloss and carrier frequency drift. Since the monitors are fixed, Doppler shift measurements are not taken.

A processor 78 receives the channel quality measurements and a fixed monitor identifier 80. The identifier is used to distinguish the fixed monitor from other monitors. The measurement information is sent to the base station 22/wireless network 52 using the fixed monitor transceiver 74. In one embodiment, the fixed monitor identifier is multiplexed with the channel quality measurements to identify the monitor 70 taking the measurements. The measurements are sent to the base station 22 on a periodic basis, such as every minute, every five minutes or every hour. In another embodiment, the fixed monitors are polled by the wireless network 52 using each monitor's identifier 80 to provide the channel measurements.

The base station 22 receives the measurements over the air interface 46 using its antenna or antenna array 48 and transceiver 50. A processor 54 receives the measurements and stores them in a measurement database 56. Using the known location of the fixed monitors 70, the database 56 stores the measurements along with the location of the fixed monitor 70.

FIG. 5 is a flow chart of using the fixed monitors to update cell channel conditions. A baseline of the cell channel conditions is produced, (step 82). The baseline has a record of channel quality measurements at various points in the cell. The baseline may be initially established by roving monitors, fixed monitors or both.

Periodically, the fixed monitors report the channel conditions and these conditions are stored in the database 56 along with the baseline information, (step 84). Using the currently measured channel conditions, the wireless network 52 can extrapolate the current conditions for any point on the baseline, (step 86). To illustrate, a rain storm may be occurring in a cell. The fixed monitors 70 in the cell may experience a 1 decibel increase to the pathloss. Initial transmissions to wireless users in the vicinity of those fixed monitors 70 can be anticipatorily increased by 1 decibel to compensate.

If the new channel conditions persist, such as for a day or week, the new extrapolated baseline is used to overwrite the prior baseline, (step 88). The new extrapolated baseline, preferably, averages channel condition measurements over time. To illustrate, a new base station may be set up in a neighboring cell, due to increased demand. The new base station may permanently impact the channel conditions for the cell.

FIG. 6 is an illustration of site planning for a cell's base station. As illustrated, the cell has three potential sites $90_1$, $90_2$, $90_3$ (90) for a base station 22. These sites may be selected based on simulations, as to the best sites, a few site measurements, engineering judgment or based on centrality and elevation. Although these techniques can be used to estimate the optimum site for a base station 22, the assumptions and incomplete cell information may result in a sub-optimum location being utilized for a base station 22.

As illustrated in FIG. 6, the cell has multiple buildings $28_1$, $28_2$, hills $24_1$, $24_2$ and wooded areas $26_1$, $26_2$. The impact of these constraints as well as others make it difficult, if not impossible, to pick the optimum base station location.

FIG. 7 is a flow diagram for base station site selection. Initially, candidate sites for a base station 22 are selected, (step 92). The selected sites may be a single site, which is being analyzed to assess the expected performance at that site.

A temporary version of a base station is set up at each the candidate sites 90 and they transmit a broadcast channel (step 94). The temporary base station may be a temporary structure or be on a moving vehicle, such as a van or flatbed truck/trailer. A roving monitor 30 travels through the cell measuring the channel conditions at various points within the cell, (step 96). The channel quality measurements are recorded, such as using the embodiments of FIGS. 2A and 2B, (step 98).

Using the stored results for each site 90, the optimum site is selected, (step 100). Each site can be tested sequentially. The site is set up and the roving monitor analyzes the channel conditions. Alternately, the sites can be analyzed in parallel. To eliminate interference between the sites, preferable the base station sites broadcast in a time multiplexed format. To illustrate, one base station broadcasts for a set period, such as a tenth of a second or a second, followed by another base station, and so on. The analysis of an entire cell can be performed relatively quickly. To illustrate, if the driver is traveling at 60 mph (26.8 n/sec) and measurements are taken every 10 ms or 100 ms, the driver is taking a sample every 0.268 or 2.68 meters, respectively. Averaging the results can be performed to improve the estimates.

In the case of a cell being divided into multiple smaller cells, and where there are preexisting fixed monitors in the original cell, the fixed monitors can be used to provide information to aid in site selection.

The selection criteria for the optimum site include the site having the overall best channel condition, the site having the least dead spots, or other criteria. Using field data, as collected by the roving monitors, allows for a more optimum selection of the base station site, reducing the chance that a base station is constructed on a sub-optimal site.

In one embodiment, the measurement information is downloaded into a computer and a map is made of the power, pathloss, interference and Doppler. The map may be labeled with the time of day at periodic points. Power levels can be shown in color or other visual means. The sites may be tested under various conditions as well. As a result, the optimum site for the average or worst case conditions can be selected. Such information can be taken at various times of the day, under various weather conditions, on various days of the week, and in various seasons.

What is claimed is:

1. A mobile wireless monitoring device comprising:
   an antenna for receiving signals from a monitored source;
   a channel quality measurement device, configured to measure the received signal code power (RSCP) of the Primary Common Control Physical Channel (P-CCPCH), the interference signal code power (ISCP), and the pathloss for the P-CCPCH of the received signals;
   a location determining device for determining the geographic location of the mobile wireless monitoring device;
   a processor, in communication with the location determining device and the channel quality measuring device, the processor configured to receive and store the received measurements and a location for the measurements using the determined locations; and
   an input/output (I/O) device, in communication with the processor, the I/O device configured to receive data from an operator of the mobile wireless monitoring device.

\* \* \* \* \*